United States Patent
Deborgies

(10) Patent No.: US 9,760,510 B2
(45) Date of Patent: Sep. 12, 2017

(54) DYNAMIC PAIRING DEVICE

(75) Inventor: Luc Deborgies, Versailles (FR)

(73) Assignee: INGENICO GROUP, Paris (FR)

( * ) Notice: Subject to any disclaimer, the term of this patent is extended or adjusted under 35 U.S.C. 154(b) by 43 days.

(21) Appl. No.: 13/992,963

(22) PCT Filed: Dec. 7, 2011

(86) PCT No.: PCT/EP2011/072005
§ 371 (c)(1),
(2), (4) Date: Oct. 3, 2013

(87) PCT Pub. No.: WO2012/076571
PCT Pub. Date: Jun. 14, 2012

(65) Prior Publication Data
US 2014/0025849 A1 Jan. 23, 2014

(30) Foreign Application Priority Data

Dec. 10, 2010 (FR) ...................... 10 04830

(51) Int. Cl.
*G06F 3/00* (2006.01)
*G06F 13/20* (2006.01)
(Continued)

(52) U.S. Cl.
CPC .............. *G06F 13/20* (2013.01); *G06F 21/35* (2013.01); *G06F 21/43* (2013.01); *G06K 7/0008* (2013.01);
(Continued)

(58) Field of Classification Search
None
See application file for complete search history.

(56) References Cited

U.S. PATENT DOCUMENTS 6,189,105 B1 2/2001 Lopes
6,958,682 B2 10/2005 Lefaure
(Continued)

FOREIGN PATENT DOCUMENTS

EP 0843425 A2 5/1998
FR 2824943 A1 11/2002

OTHER PUBLICATIONS

International Search Report dated Mar. 6, 2012 for corresponding International Application No. PCT/EP2011/072005, filed Dec. 7, 2011.

(Continued)

*Primary Examiner* — Henry Tsai
*Assistant Examiner* — Aurangzeb Hassan
(74) *Attorney, Agent, or Firm* — David D. Brush; Westman, Champlin & Koehler, P.A.

(57) ABSTRACT

A system for dynamic pairing between a first peripheral, which can dialogue with a memory card, and a second peripheral, which is connected to a computer. The first peripheral is configured to read the data contained in the memory card, to receive via a first communication channel a first item of information emitted by the second peripheral, and to emit via a second communication channel a second item of information. The second peripheral is configured to emit via the first communication channel the first item of information and to receive via the second communication channel the second item of information. The value of this second item of information conditions the authorization to open a bidirectional communication channel between the first and the second peripherals.

32 Claims, 9 Drawing Sheets

(51) Int. Cl.
*G06F 21/35* (2013.01)
*G06F 21/43* (2013.01)
*G06K 7/00* (2006.01)
*H04L 9/32* (2006.01)
*G06F 13/40* (2006.01)
*G06F 3/06* (2006.01)
*H04L 29/06* (2006.01)

(52) U.S. Cl.
CPC ........ *H04L 9/3215* (2013.01); *H04L 63/0492* (2013.01); *H04L 63/0853* (2013.01); *H04L 63/18* (2013.01); *G06F 3/067* (2013.01); *G06F 3/0635* (2013.01); *G06F 13/4022* (2013.01); *H04L 63/0428* (2013.01); *H04L 2209/80* (2013.01)

(56) References Cited

U.S. PATENT DOCUMENTS

| | | | |
|---|---|---|---|
| 7,392,061 B2* | 6/2008 | Hurwitz et al. | 455/552.1 |
| 2004/0248513 A1* | 12/2004 | Glass et al. | 455/41.1 |
| 2006/0041746 A1* | 2/2006 | Kirkup | G06F 21/35 713/168 |
| 2007/0251997 A1* | 11/2007 | Brown et al. | 235/380 |
| 2009/0036164 A1* | 2/2009 | Rowley | H04L 63/0823 455/558 |
| 2009/0037729 A1* | 2/2009 | Smith | H04L 9/3234 713/158 |
| 2010/0211784 A1* | 8/2010 | Lagosanto | H04L 69/163 713/168 |
| 2011/0265149 A1* | 10/2011 | Ganesan | H04L 9/3226 726/4 |
| 2011/0265156 A1* | 10/2011 | Bombay | G06F 21/34 726/5 |
| 2012/0159163 A1* | 6/2012 | von Behren | G06Q 20/3552 713/168 |
| 2012/0324067 A1* | 12/2012 | Hari | G06F 13/385 709/222 |

OTHER PUBLICATIONS

French Search Report dated Jun. 17, 2011 for corresponding French Application No. FR 1004830, filed Dec. 10, 2010.
English translation of the Written Opinion dated Mar. 6, 2012 for corresponding International Application No. PCT/EP2011/072005, filed Dec. 7, 2011.

* cited by examiner

DYNAMIC PAIRING DEVICE

CROSS-REFERENCE TO RELATED APPLICATIONS

This Application is a Section 371 National Stage Application of International Application No. PCT/EP2011/072005, filed Dec. 7, 2011, which is incorporated by reference in its entirety and published as WO 2012/076571 on Jun. 14, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present invention pertains to dynamic pairing between two peripherals, and especially to a dynamic pairing device.

The invention can be applied for example to processes of authentication by memory card, for example smart cards which, in addition to memory means, have a microcontroller or microprocessor and, possibly, a cryptographic module. It can be applied especially but not exclusively to the opening of sessions on a workstation.

BACKGROUND OF THE DISCLOSURE

Memory cards are presently very widely used because of their high level of security. In particular, they are used in the context of the securing of access to workstations. In this application, the workstation is equipped with a memory card reader connected to the computer. When a user wishes to use this workstation, he inserts his card into the dedicated reader. Depending on applications, the software requests him to key in his pin code to validate the opening of the session.

Memory cards can also integrate a contactless communications channel. This type of card equipped with an antenna can dialog remotely with a dedicated receiver.

In the context of an application for opening sessions on a computer, the use of a contactless card is extremely worthwhile because the user no longer has to insert his card into a dedicated reader connected to said computer, since the card remotely transmits, for example, the codes for starting the session.

However, this method has the drawback of not being discriminating when the card is within range of several computers. The card does not know which computer it must get connected to, in other words which computer the card bearer has chosen to work with.

SUMMARY

According to one embodiment, the invention is aimed at a system of dynamic pairing between two peripherals, where the first peripheral dialogs with a memory card while the second peripheral is connected to a computer.

In one embodiment of the invention, the memory card is carried around the neck in a first device, for example a badge-holder or a pocket. A second device, called a "base" here below in the description, is directly connected to the computer. In a multi-computer environment, there will therefore be a multitude of bases.

As mentioned preliminarily, in order to distinguish the workstation aimed at by the user, it is necessary to envisage a deliberate act on the part of the bearer. Since the card is situated very close to the body (around the neck or in a pocket), it is possible to use the human body as an antenna and thus initialize a communications channel between the badge-holder and the base. This initialization can for example consist in exchanging an encryption key and then starting a radiofrequency communication encrypted with this key. When this communication is set up, it is easy to transmit the necessary identifiers contained in the memory card in order to automatically open a session on the workstation.

Two communications technologies, known to those skilled in the art, can be advantageously used in this invention: capacitive coupling and radio frequency.

According to a general aspect of the invention, a device is therefore proposed for dynamic pairing between a first peripheral capable of dialoguing with a memory card, such as a smart card, and a second peripheral connected to a computer.

According to one general characteristic of this aspect, said first peripheral comprises means capable of reading the data contained in said memory card, means capable of receiving, via a first communications channel, a first piece of information, sent by said second peripheral and means capable of sending a second piece of information via a second communications channel, and said second peripheral comprises means capable of sending said first piece of information via said communications channel and means capable of receiving said second piece of information via said second communications channel, the value of this second piece of information being a condition for authorization to open a two-way communications channel between said first peripheral and said second peripheral, this two-way channel being advantageously the second communications channel.

Said first communications channel is advantageously made in the form of a capacitive coupling via a human body between said second peripheral and said first peripheral.

According to one embodiment, the means of the first peripheral capable of receiving said first piece of information via the first communications channel include a first module capable of receiving said first piece of information by capacitive coupling with a human body and the means of the second peripheral capable of sending said first piece of information via said first communications channel comprise a first module capable of sending said first piece of information by capacitive coupling via said human body.

According to one embodiment, the first module of the second peripheral comprises means for detecting the proximity of the human body, a sender and an antenna capable of transmitting said first piece of information on the frequency of the first communications channel and the first module of the second peripheral comprising an antenna and a receiver.

The means for detecting comprise for example a capacitive touch-sensitive zone.

The frequency of said first communications channel is advantageously equal to 125 KHz.

The second communications channel is advantageously a radiofrequency channel, the frequency of which is for example in an ISM band.

According to one embodiment, the means of the first peripheral capable of sending said second piece of information via said second communications channel comprise a second transceiver radiofrequency module and the means of the second peripheral capable of receiving said second piece of information via said second communications channel comprise a second transceiver radiofrequency module.

Said first piece of information is for example a value representing the network address of said second peripheral and a piece of pseudo-random data generated within said second peripheral.

Advantageously, the second peripheral comprises means configured to generate said piece of pseudo-random data and to generate a new piece of pseudo-random data at each new detection of the human body, for example at each detection of a hand.

Said second piece of information can for example be a piece of data representing the network address of said first peripheral and of said first piece of information.

As a variant, said second piece of information can comprise said piece of pseudo-random data, possibly with a received signal strength indicator (RSSI parameter).

Be that as it may, whatever the variant, it is advantageously the pseudo-random piece of data that will be a condition for opening or not opening the two-way channel.

Thus, according to a preferred embodiment, said second peripheral comprises means configured to verify that the piece of pseudo-random data received via said second piece of information is identical to the piece of pseudo-random data transmitted via said first piece of information and to authorize the opening of the two-way channel if this verification is positive and, if not, to reject said opening.

Said two-way communications channel is for example a unicast wireless network between two peripherals and/or can be an encrypted channel.

In an application for opening a session, the memory card contains pieces of information for opening a session on said computer and, according to one embodiment, the first peripheral comprises means capable of transmitting said pieces of information for opening a session on the two-way communications channel and the second peripheral comprises means capable of receiving said pieces of information for opening a session and transmitting them to said computer.

According to one embodiment, the second peripheral comprises first means of control capable of detecting a moving away of the first peripheral from the second peripheral and capable of initiating a closing of a session on the computer.

According to one embodiment, the second peripheral comprises second means of control capable of detecting a loss of connection on the two-way communications channel and of initiating a closing of a session on the computer.

According to one embodiment, the second peripheral comprises third means of control capable of initiating an interruption of connection with a first already paired peripheral in the event of a new detection of a human body by the detection means.

The first peripheral can be a case, for example a badge-holder type of case, capable of receiving said memory card.

According to another aspect of the invention, there is proposed a case, for example of the badge-holder type, forming the first peripheral of the device as defined here above and comprising a housing to receive the memory card.

According to another aspect, there is proposed a base forming the second peripheral of the device and advantageously comprising a capacitive touch-sensitive zone.

According to another aspect of the invention, there is proposed a method of dynamic pairing between a first peripheral dialoguing with a memory card and a second peripheral connected to a computer.

According to one general characteristic of this other aspect, said first peripheral receives, via a first communications channel, a first piece of information sent by said second peripheral and sends a second piece of information, via a second communications channel, that said second peripheral receives, the value of this second piece of information being a condition of authorization to open a two-way communications channel between said first and said second peripherals.

According to one mode of implementation, the second peripheral generates a piece of pseudo-random data during the detection of a proximity of the human body, for example a hand, and preferably generates a new piece of pseudo-random data at each new detection of the human body, and said first piece of information is a value representing the network address of said second peripheral and the piece of pseudo-random data.

Said second piece of information advantageously contains at least said piece of pseudo-random data and is for example a piece of data representing the network address of said first peripheral and said first piece of information.

According to a preferred mode of implementation, said second peripheral verifies that the piece of pseudo-random data received via said second piece of information is identical to the piece of pseudo-random data transmitted via said first piece of information and authorizes the opening of the two-way channel if this verification is positive and rejects this opening if not.

According to one mode of implementation applicable during an opening of a computer session, the memory card contains pieces of information for opening a session on said computer and the first peripheral transmits said pieces of information for opening a session on the two-way communications channel and the second peripheral transmits them to said computer.

The second peripheral advantageously detects a moving away of the first peripheral from the second peripheral and initiates a closing of session on the computer.

The second peripheral can also detect a loss of connection on the two-way communications channel and initiates a closing of session on the computer.

The second peripheral can also initiate an interruption of connection with an already paired first peripheral if there is a new detection of proximity of a human body.

BRIEF DESCRIPTION OF THE DRAWINGS

Other advantages and characteristics shall appear from the following detailed description of modes of implementation and embodiments that is in no way exhaustive, and from the appended drawings, of which.

DETAILED DESCRIPTION OF ILLUSTRATIVE EMBODIMENTS

Figure 1:
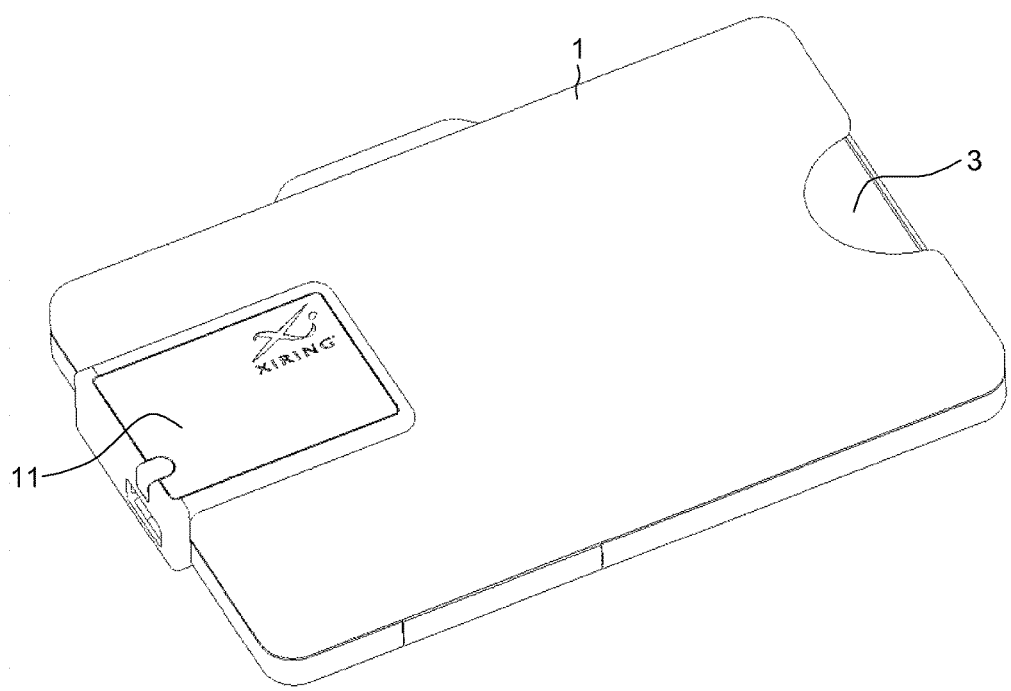
FIG. 1 schematically illustrates a view in perspective of an example of an embodiment of a badge-holder according to the invention, FIG. 2 schematically illustrates the front view of the badge-holder of FIG. 1, FIG. 3 schematically illustrates an example of a hardware architecture of a first peripheral or badge-holder according to the invention, FIG. 4 schematically illustrates a view in perspective of an example of an embodiment of a second peripheral or base according to the invention, FIG. 5 schematically illustrates an example of a hardware architecture of a second peripheral according to the invention, FIG. 6 schematically illustrates a block diagram of the functioning of a pairing device according to the invention, and FIGS. 7 to 12 provide a more detailed illustration of different modes of implementation of a method according to the invention corresponding to different modes of functioning of a device according to the invention.
Figure 2:
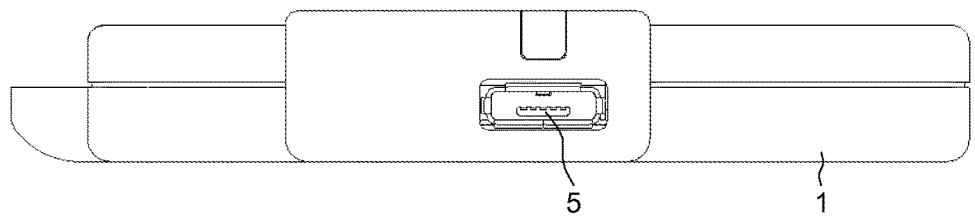

According to FIG. 1 or 2, the first peripheral 1 takes the form of a case that can physically receive the memory card 3 and is capable of dialoguing with it in "contactless" mode or in "contact" mode. Such a memory card is also commonly called a "smart card" or "microcircuit card". This first peripheral, in the form of a badge-holder, also integrates a USB type connector 5 enabling at least the power recharging of the battery contained in the periphery. This connector can also enable the direct connection of this peripheral with the computer, thus becoming a PC/SC reader. This peripheral also integrates a block 11 containing a first module capable of receiving information via a capacitive coupling technology and a second module capable of sending and receiving information via a radiofrequency technology. Finally, an energy source that is rechargeable and capable of obtaining sufficient autonomy for the chosen mode of use is also integrated into this first peripheral 1.

Figure 3:
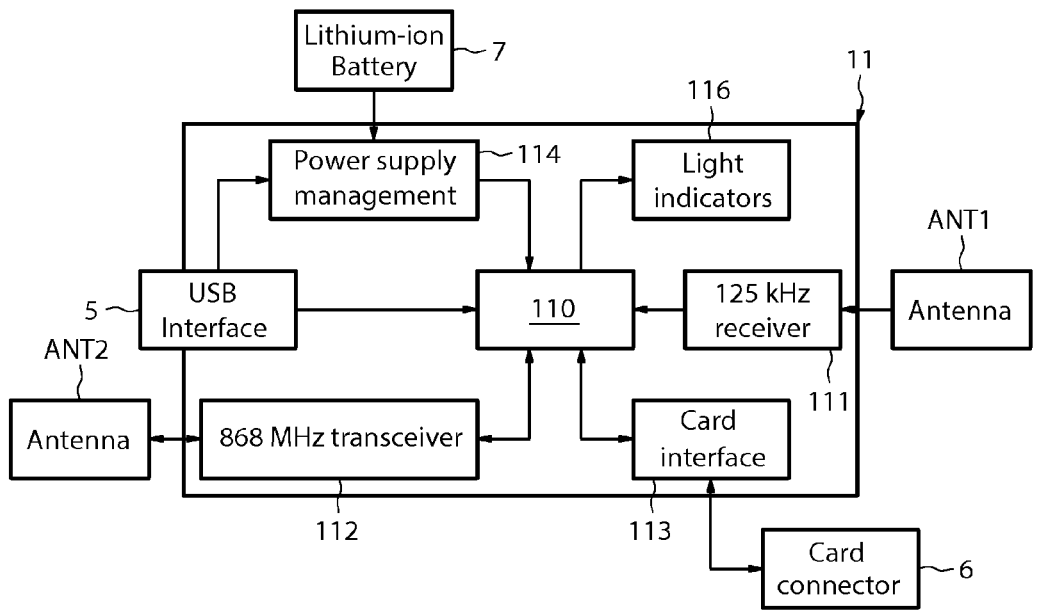

Referring more particularly now to FIG. 3, it can be seen that the hardware architecture of the block 11 of the badge-holder 1 is based on processing means 110, for example a microcontroller or a microprocessor.

The block 11 comprises means such as a card connector 6 and an interface 113 capable of reading the data contained in said memory card when said memory card is inserted into the connector 6.

The block 11 also has means capable of receiving a first piece of information sent by the second peripheral via a first communications channel, the structure of which shall be seen in greater detail here below. This block comprises the first "capacitive coupling" module mentioned here above and herein includes an antenna ANT1, a 125 KHz receiver 111 that has a classic structure and is known per se, connected to the microcontroller 110.

The block 11 also has means, including the second radiofrequency module mentioned here above, capable of sending a second piece of information via a second communications channel. It shall be seen in greater detail here below that this channel is advantageously a radiofrequency channel. These means comprise another antenna ANT2, a transceiver 112, for example an 868 MHz transceiver that has a classic structure and is known per se, connected to the microprocessor 110.

Apart from these means, FIG. 3 shows the USB interface forming the connector 5, power supply management means 114 connected to the battery 7 as well as light indicators, for example light-emitting diodes 116, intended for the viewing by the user of the different states of operation of the badge-holder and especially the setting up of the different links with the second peripheral.

Figure 4:
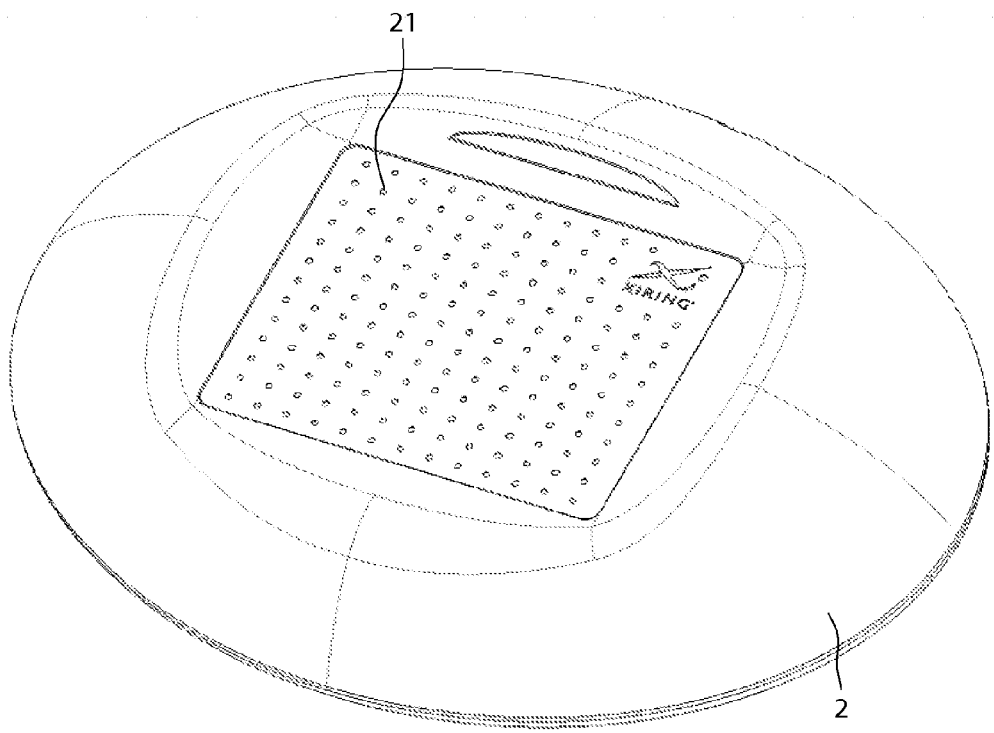
Figure 5:
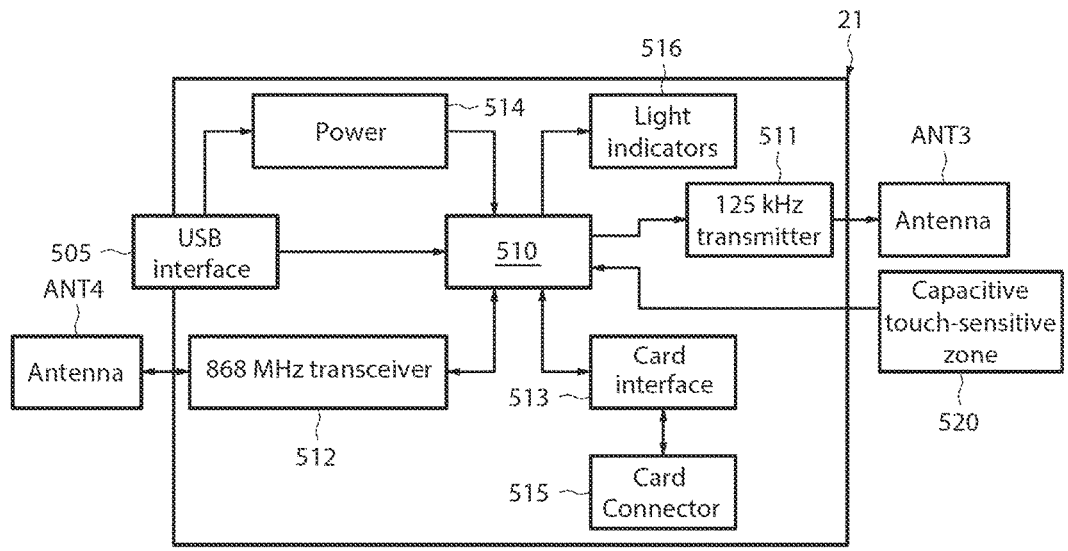

According to FIG. 4, the second peripheral 2 first of all has means to get connected advantageously in USB mode to the host computer. The energy that it needs will be obtained via this connection.

This second peripheral 2 integrates a block 21 containing a first module capable of sending information via a capacitive coupling technology and a second module capable of sending and receiving information via a radiofrequency technology.

The hardware architecture of the block 21 of the base 2 is also based on processing means 510 such as a microprocessor.

The block comprises means including the first "capacitive coupling" module mentioned here above capable of sending said first piece of information via the first communications channel. These means incorporate especially a 125 KHz transmitter that has a classic structure and is known per se coupled to an antenna ANT3 and also connected to the microprocessor 510.

The block 21 also comprises means incorporating the second radiofrequency module mentioned here above, capable of receiving said second piece of information via the second communications channel. These means herein comprise a radiofrequency transceiver 512, especially an 868 MHz transceiver connected to an antenna ANT4 as well as a microprocessor 510.

The means capable of sending the first piece of information via the first communications channel herein also comprise a capacitive touch-sensitive zone 520 connected to the microprocessor 510.

In one particular embodiment, the capacitive touch-sensitive zone 520 is comb-shaped and the antenna ANT3 is also comb-shaped, the teeth of the two combs being imbricated.

The figure also shows the USB interface 505 connected to power supply management means 514 that enable the base to be powered via the computer.

Here again, the light indicators 513, for example light-emitting diodes, enable the user to view the state of the base and especially the setting up of the different connections with the badge-holder.

It is also possible for the base to be capable of being used directly with the memory card without using a badge-holder. In this case there is provided a card connector 515 connected to the microprocessor 510 by an interface 513.

Figure 6:
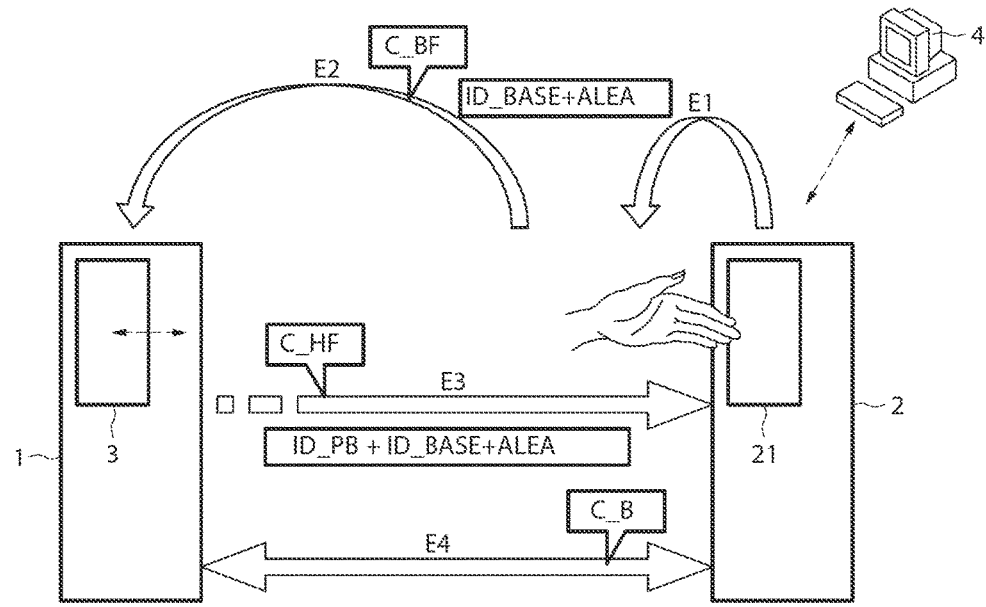

According to the block diagram shown in FIG. 6, a two-way communications channel C_B is set up between the two peripherals as follows:

via its "capacitive coupling" module, the base 2 waits for the detection of a proximate human hand.

via its "capacitive coupling" module, the badge-holder 1 waits for an initialization of communication.

E1->As soon as a human hand is detected, the base 2, through its "capacitive coupling" module, sends a value representing its "network" address ID_BASE and having a pseudo-random value that is generated by the base 2 and modified at each detection of a hand. This pseudo-random value is referenced ALEA.

E2->These two pieces of information are transmitted through the human body (first channel C_BF) and are received by the "capacitive coupling" module of the badge-holder 1 if this badge-holder is situated close to said human body.

E3->Following this reception, the badge-holder 1, through its radiofrequency module, sends a piece of data (on the second channel C_HF) representing its "network" address ID_PB, the "network" address ID_BASE received on the base 2 and the ALEA. The base receives this piece of data by means of its radiofrequency module and verifies that the ALEA received is truly that which had been sent and then authorizes the unicast connection.

E4->Base 2 and badge-holder 1 have thus initialized a two-way radiofrequency communication C_B which is a unicast communication between the two peripherals.

Those skilled in the art will easily understand that the two-way communications channel C_B thus set up uses the same frequency as the channel preliminarily used by the badge-holder for the transmission of its "network" address (step E3).

With this two-way communications channel being initialized, the information related for example to the opening of a session on the computer 4 can therefore be transmitted from the card through the badge-holder to the computer via the base.

When the user wishes to close his session on the workstation, it is enough for him to move away from it, for example by a few steps, for a sufficient period of time and the radiofrequency link will be automatically cut. Thus, the software of the base will initiate a closing of session on the computer.

The principle of the invention enables the dynamic pairing of, for example, a badge-holder and a base through a deliberate human act.

According to one preferred embodiment of the invention, the capacitive coupling technology for the first communications channel is used at a frequency of 125 KHz. This technology, known to those skilled in the art, uses the capacitances of the human body for the efficient transmission of this range of frequencies.

According to another embodiment of the invention, the radiofrequency band for the second communications channel is in an ISM band. The ISM (industrial, scientific and medical) bands are frequency bands that are not subject to national regulations and can be used freely (free of charge and without authorization) for industrial, scientific and medical applications. The only obligations to be met are those related to transmission power and frequency deviations or the disturbing of neighboring frequencies. The typical fields of application are wireless networks. In the context of the invention, the 868 MHz frequency has been chosen and can be different without in any way modifying the scope of the invention.

Thus, it is possible to use a frequency chosen for example in the 863-870, 902-928 MHz or 950-960 MHz ISM bands.

Referring now more particularly to FIGS. 7 to 12, a more detailed illustration is provided of the modes of operation of the device which herein uses a smart card as a memory card.

As indicated here above, the device according to the invention and in particular the base simplifies the carrying of a smart card used as a badge and as an authentication card on a computer. Indeed, to activate communication between the base and the badge-holder, the user touches the touch-sensitive zone of the base. This base sets up a secured channel towards the badge-holder in order to communicate with it. Thus, the user does not have to remove the smart card from his badge to insert it for example into a PC/SC reader.

Figure 7:
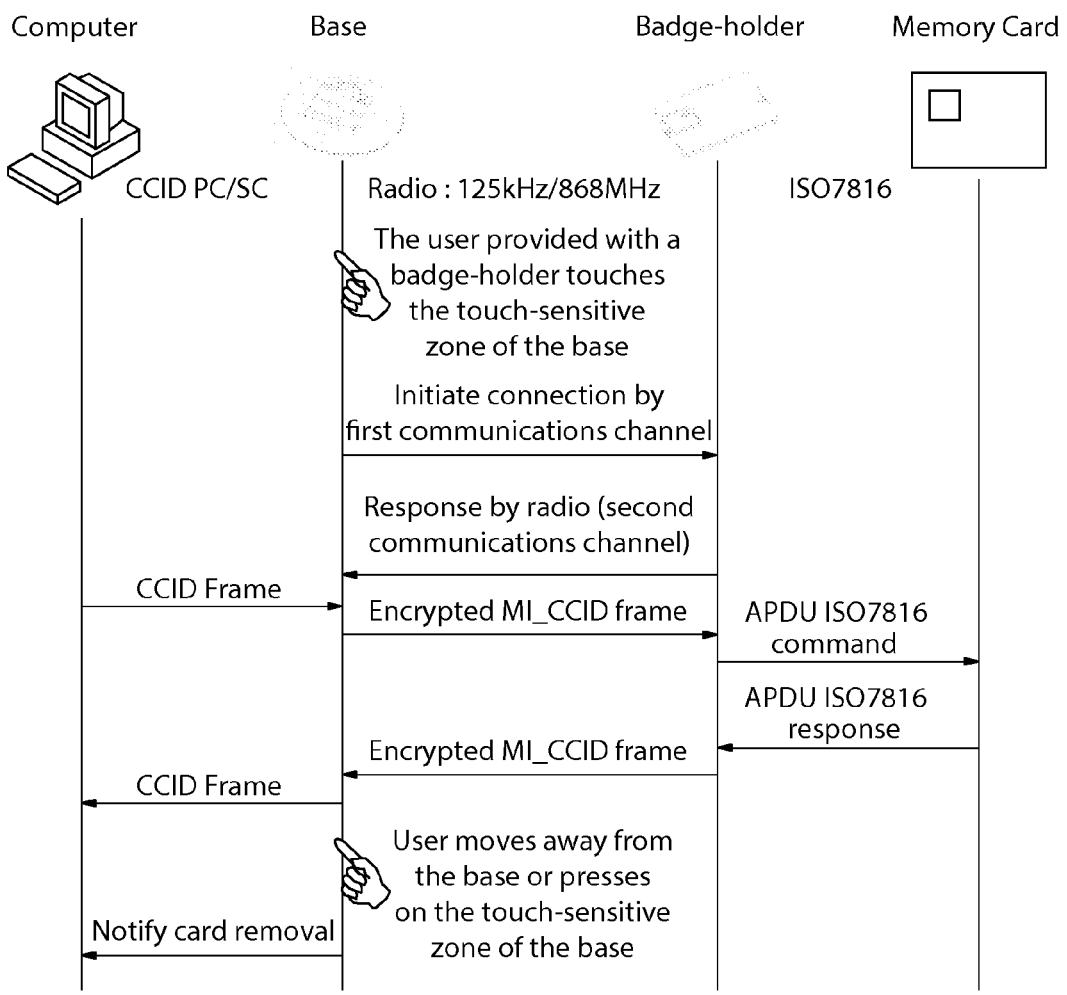

As illustrated in FIG. 7 and the following figures, the badge-holder and the base communicate via two links on two communications channels:
 a 868 MHz carrier two-way radiofrequency link using a frequency modulation,
 a 125 KHz carrier one-way radio link using an amplitude modulation going from the base to the badge-holder, using the user's body to channel the signal from the base to the badge-holder.

As indicated here above, the user carries the badge-holder by means of a clamp or a neck strap. Thus, the badge-holder is in proximity to the user's body (by a few centimeters). Preferably, the pairing is not possible in principle if the badge-holder is not close to the user's body.

As illustrated in FIG. 7, when the user touches the touch-sensitive zone of the base, the base sends its identifier (address) to the badge-holder via the capacitive link set up by the first communications channel and the badge-holder responds through the radio link on the second communications channel.

Once the pairing has been done, the link between the base and the badge-holder is done on the two-way communications channel which herein is the second communications channel, for example by means of CCID (circuit card interface device) frames of structures compliant with that described in the document "Specification for Integrated Circuit(s) Cards Interface Devices", for example, version 1.1 dated 22 Apr. 2005.

At the same time, it is advantageous to use specific frames referenced Mi_CCD on the two-way communications channel and for the dialog between the base and the badge-holder. These frames Mi_CCD, which are from the CCID specification mentioned here above, have a header that is smaller than the ten bytes habitually used in the header of the CCID frames. This optimizes the bit rate of data transmitted. In order to comply with the standards on information transfer standards the use, if any, of these Mi_CCID frames is reserved solely for radiofrequency transmission on two-way communications channels between the base and the badge-holder.

The CCID and Mi_CCID frames can be encrypted if necessary. Communications between the computer and the base via the USB link are made by means of CCID frames.

Besides, in the example described here, the link between the badge-holder and the memory card is made by means of APDU (Application Protocol Data Unit) commands and responses compliant with the ISO 7816 standard.

It must also be noted that, when the pairing is terminated between a base and badge-holder, the first communications channel is in any case inoperative because, in practice, the user no longer touches the touch-sensitive zone of the base and his body can therefore no act as a channel between the base and the badge-holder.

Besides, on the first communications channel, for the communications between the base and the badge-holder, the protocol used may for example be the MiWi protocol which is particularly provided for data transmissions at low bit rates and over short distances.

At the same time, even with this protocol, whether the frames exchanged are CCID frames or Mi_CCID frames, they comply with the structure of the commands described in the CCID specification mentioned here above.

As shall be seen in greater detail here below, when the user moves away from the base or presses on the touch-sensitive zone of the base, there is an interruption of the connection, which results for example in the sending to the computer of a notification equivalent to a removal of a card leading to the interruption of the session opened at the workstation.

Figure 8:
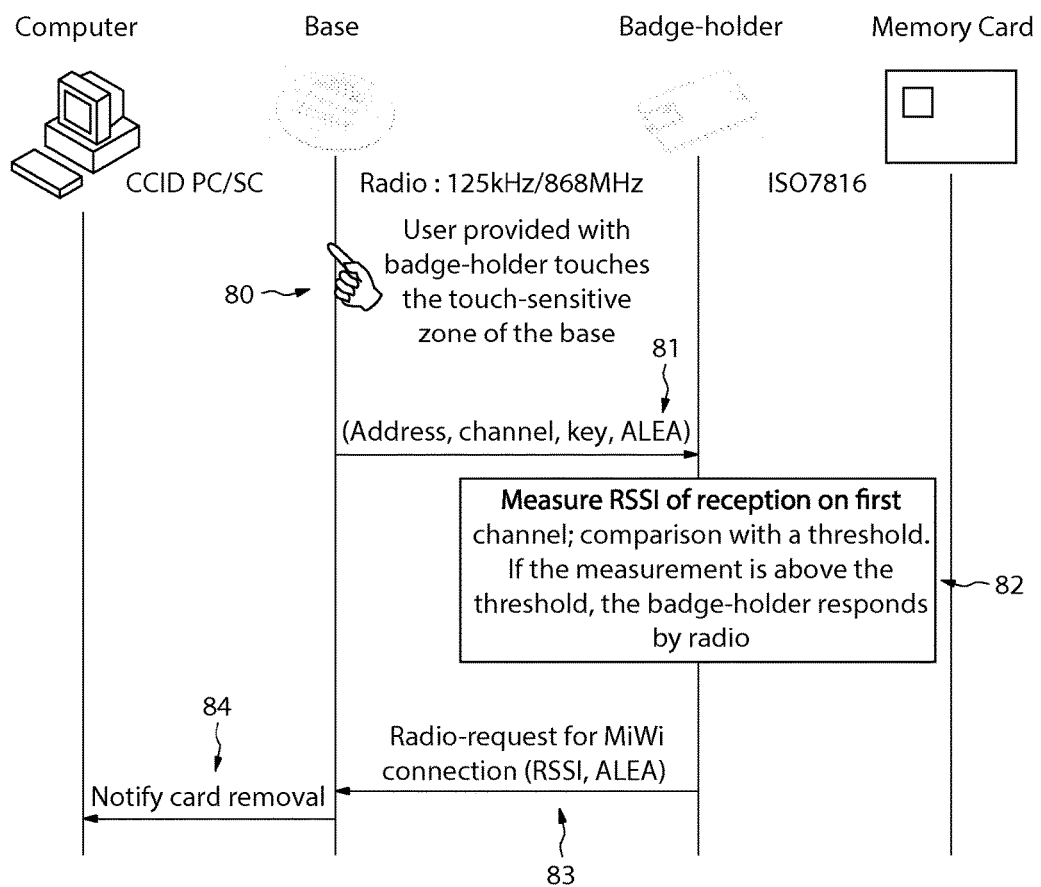

Referring more particularly now to FIG. 8, a description is provided of an example of pairing between the base and a badge-holder in greater detail.

More particularly, when the user touches the touch-sensitive zone of the base (step 80), the means 510, 511 and ANT3 of the base transmit a first piece of information herein comprising the address of the base, the number of the radio channel used, an encryption key if any (for example on 64 or 128 bits), itself being preferably encrypted for example according to the Diffe Hellman method well known to those skilled in the art, as well as the piece of random data ALEA generated in the base (step 81).

The badge-holder processing means herein measure the RSSI (Received Signal Strength Indication) parameter giving a measurement of the received signal strength in order to make sure that the badge is truly worn by the user. Indeed, the RSSI parameter measured by a badge-holder worn on a user's body is far greater than the RSSI parameter of a badge-holder that is not close to the user's body.

The badge-holder advantageously gets connected to the base if the RSSI reception parameter is above a certain threshold.

In the variant described here, the base accepts the connections of all the badge-holders for a defined period of time. It then disconnects all the badge-holders except the one which has the greatest RSSI parameter.

Besides, in this variant, the connection request (step 83, FIG. 8) sent by a badge-holder comprises, in addition to the RSSI parameter measured at reception, the piece of pseudo-random data ALEA which had been received by the badge-holder via the first communications channel.

The processing means of the base then verify that the pseudo-random data ALEA received truly corresponds to the pseudo-random data ALEA transmitted at the step 81 on the first communications channel.

Should this verification be positive, a command is transmitted to the computer to notify an insertion of a card (step 84) enabling the opening of the two-way communications channel between the base and the badge-holder, which will enable the transmission of the identifiers for opening a session on the workstation from the memory card to the computer via the badge-holder, the radio link, the base and the USB cable.

The base advantageously verifies the presence of the badge-holder in its field at regular intervals, for example every 500 milliseconds, starting from the last radio communication. This enables the badge-holder and the base to measure RSSI parameters and to evaluate the distance between the base and the badge-holder.

Besides, it is planned that a user, even without a badge-holder, should be capable at any time of resuming control over a workstation (computer) using an already paired badge-holder.

Figure 9:
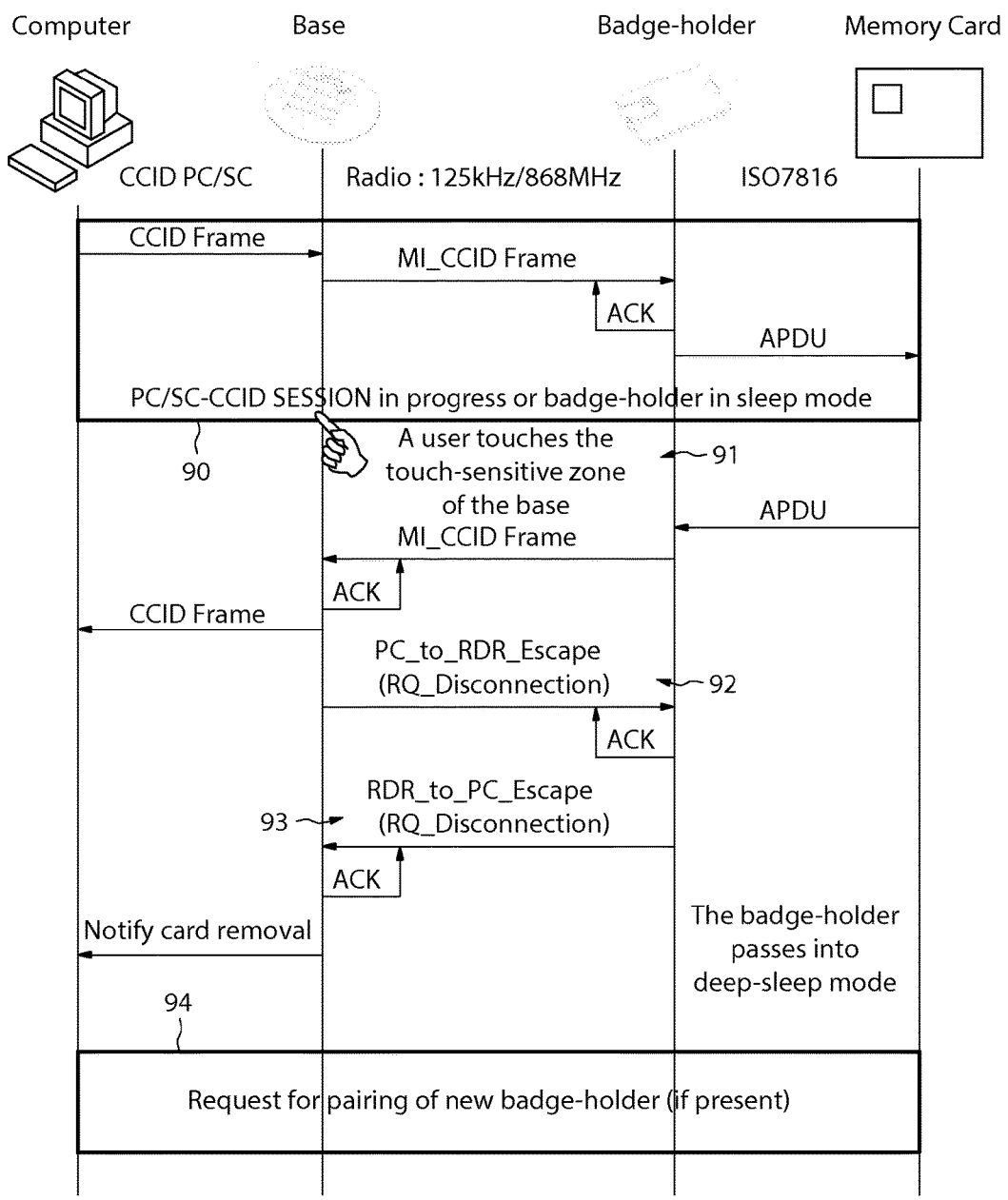

Thus, as illustrated in FIG. 9, as soon a user, even without a badge-holder, touches (step 9) the touch-sensitive zone of a base, then if this base is already paired with a badge-holder (step 90), it will wait to be able to speak to the badge-holder and ask to be disconnected from the already paired badge-holder.

More specifically, when the user touches the touch-sensitive zone of the base, a disconnection command is transmitted from the base to the badge-holder (step 92) and a disconnection command is sent back from the badge-holder to the base (step 93).

The badge-holder then passes into a deep-sleep mode while the command notifying a card removal is transmitted to the computer by control means of the base set up for example by software within the microprocessor, thus interrupting the session obtained by the workstation.

A new process of pairing the new badge-holder, if it is present, then takes place (step 94).

When a user provided with a badge-holder moves away from the base with which he is paired, the badge-holder/base pair must detect this distancing movement and decide to disconnect the badge-holder from the base if the badge-holder is considered to be far too distant from its base.

Figure 10:
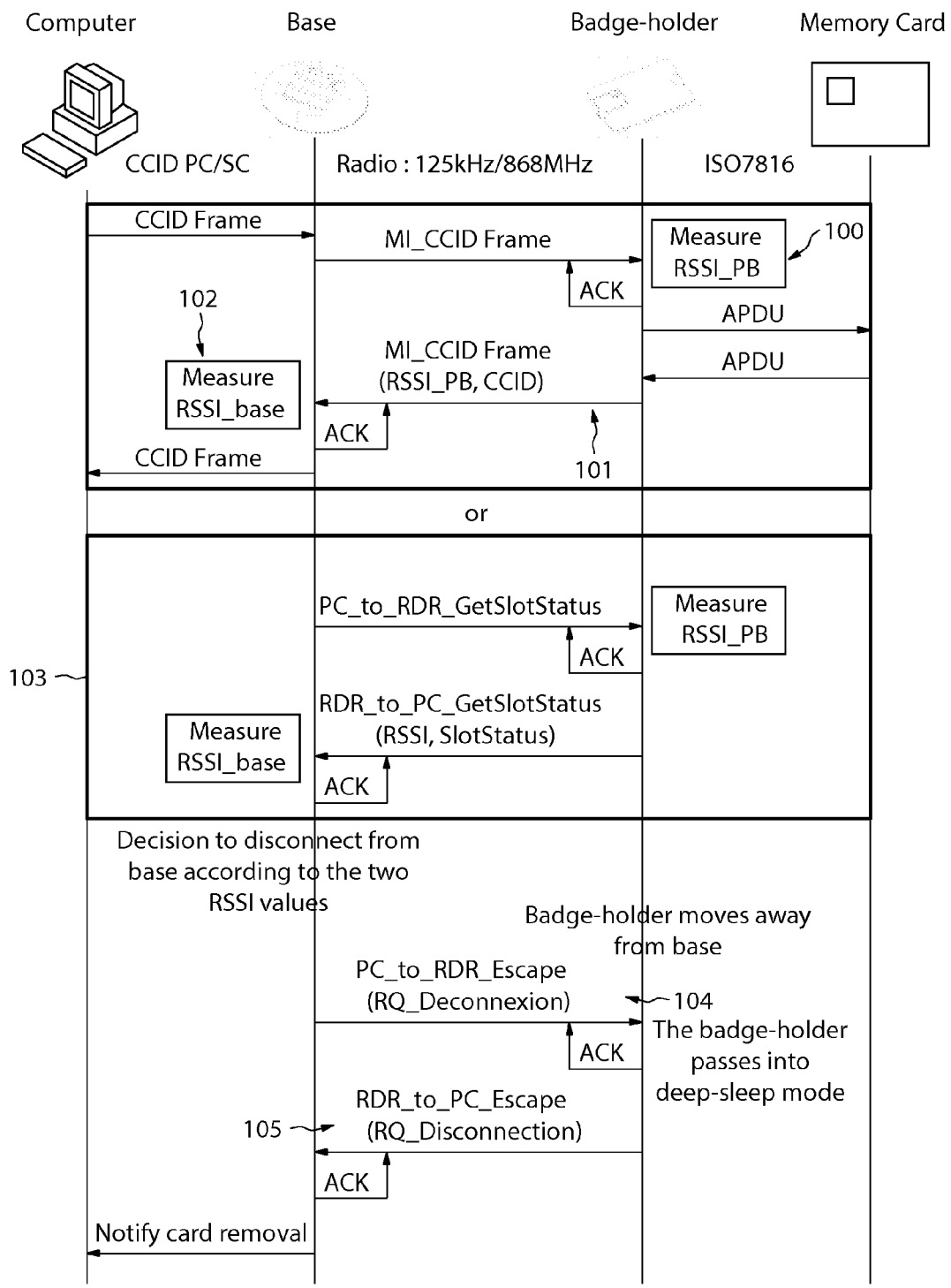

This is illustrated schematically in FIG. 10.

The evaluation of the distance is done by a measurement of the RSSI parameter both in the badge-holder direction and in the base direction. More specifically, at each reception of a frame in a badge-holder, the RSSI parameter of the reception signal is measured (step 100). The badge-holder sends back the RSSI_PB value of the RSSI parameter in reception to the base, in the response frame (step 101). The base also measures its RSSI parameter in reception during the reception of the frame (step 102).

If no CCID exchange is in progress, the base periodically sends a specific Mi_CCID frame which enables the measurement of the RSSI parameters (step 103).

Depending on the distance computed from the two measured values of the RSSI parameters, means for controlling the base (for example done by software within the microprocessor 510) can then decide to initiate a request for disconnection of the badge-holder if this distance exceeds a predefined threshold (steps 104 and 105), in a manner similar to that described with reference to FIG. 9 (steps 90 and 91).

When a base receives no response to a CCID frame within a predefined time limit, for example a time limit of ten seconds, the control means of the base take the initiative to respond to the CCID command received from the computer in reporting an error ("card removed") and will notify the workstation of the pulling away of a card (command for notifying a removal of card).

Figure 11:
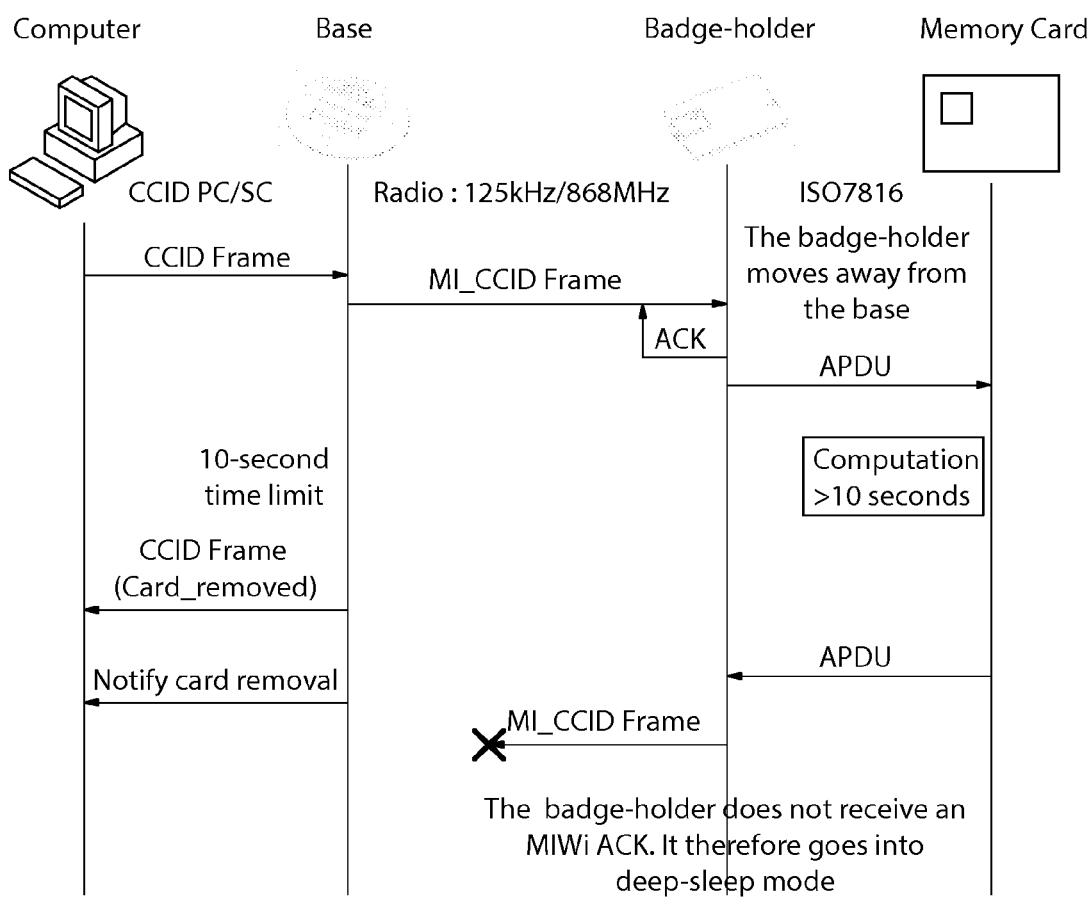
Figure 12:
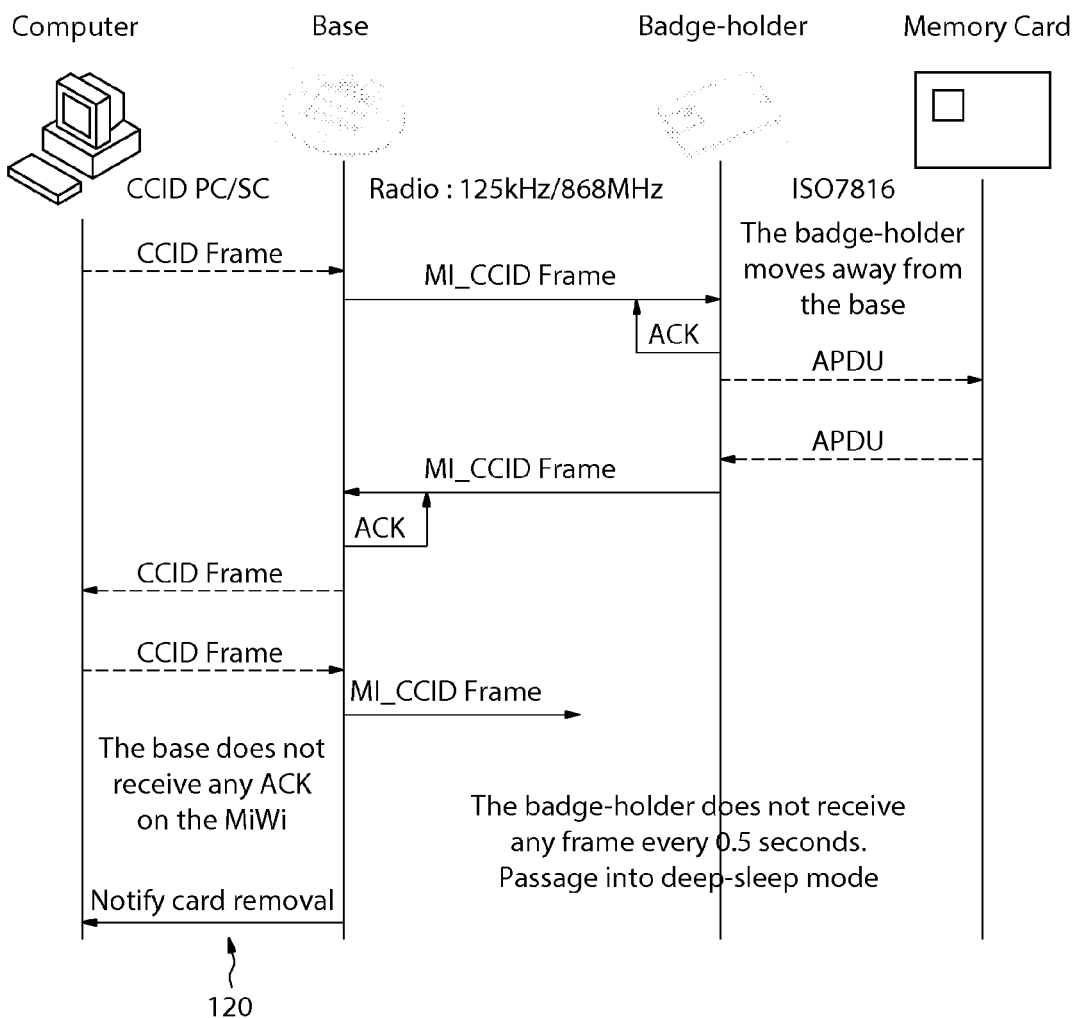

Consequently, during its response to the base, the badge-holder will receive no acknowledgement compliant with the MiWi protocol and will therefore go back into deep-sleep mode (FIG. 11).

When a badge-holder does not receive any Mi_CCID frame at least every half second for example, the processing means 110 of the badge-holder take the initiative to pass into deep-sleep mode. When the means for controlling the base no longer receive any acknowledgement ACT compliant with the MiWi protocol after the sending of a frame, they consider the badge-holder to be no longer in the field and inform the workstation of the "notification of card removal" command (step 120, FIG. 12).

There is therefore a disconnection here by loss of radio connection owing to the non-reception of a frame by the badge-holder whereas FIG. 11 illustrated the case of a disconnection by loss of radio connection in the case of a frame not received by the base.

It must also be noted that if a smart card 3 is directly inserted into the base via the connector 515, then the CCID frames are processed in the base and the card dialog is then done with the inserted smart card and the CCID frames are not transferred to the badge-holder by radio. The base then becomes a "transparent" reader. And, on a base, the insertion of a card into the connector 515 prohibits the pairing with the first peripheral (badge-holder) via the first communications channel, cuts off the radio link, if any, in progress on the two-way communications channel with a badge-holder, informs the computer of a card removal to initiate, for example, the deactivation of the session opened and in progress with the card inserted into the card carrier and then notifies the computer of an insertion of a card into the base so as to reinitiate a session with this smart card.

Although the present disclosure has been described with reference to one or more examples, workers skilled in the art will recognize that changes may be made in form and detail without departing from the scope of the disclosure and/or the appended claims.

The invention claimed is:
1. A system comprising:
a first peripheral configured to dialog with a memory card, wherein the memory card contains pieces of information for opening a session on a computer, said first peripheral being a case configured for receiving said memory card; and
a second peripheral dynamically pairable with the first peripheral and configured to be connected to the computer, said second peripheral being a base connected to the computer,
wherein said first peripheral comprises:
   means for reading data contained in said memory card,
   means for receiving, via a first communications channel, a first piece of information sent by said second peripheral, the means for receiving the first piece of information including a first module configured to receive said first piece of information by capacitive coupling with a human body, and
   means for sending to said second peripheral, in response to receipt of said first piece of information, a second piece of information via a second communications channel, wherein the second piece of information has a value being a condition for authorization to open a two-way communications channel between said first peripheral and said second peripheral;
wherein said second peripheral comprises:
   means for sending to said first peripheral said first piece of information via said first communications channel, which includes a first module configured to send said first piece of information by capacitive coupling via said human body;
   means for receiving said second piece of information sent by said first peripheral via said second communications channel; and
   means for opening the two-way communications channel in response to the second piece of information, and
wherein the first peripheral comprises means for transmitting said pieces of information for opening the session on the two-way communications channel and the second peripheral comprises means for receiving said pieces of information for opening the session and transmitting them to said computer.

2. The system according to claim 1, wherein said first communications channel is made in the form of a capacitive coupling via a human body between said second peripheral and said first peripheral.

3. The system according to claim 1, wherein the first module of the second peripheral comprises means for detecting proximity of the human body, a sender and an antenna capable of transmitting said first piece of information on a frequency of the first communications channel and the first module of the second peripheral comprising an antenna and a receiver.

4. The system according to claim 3, wherein the means for detecting comprise a capacitive touch-sensitive zone.

5. The system according to claim 1, wherein the frequency of said first communications channel is 125 KHz.

6. The system according to claim 1, wherein the second communications channel is a radiofrequency channel.

7. The system according to claim 1, wherein the frequency of said second transmission channel is in an industrial, scientific, and medical (ISM) band.

8. The system according to claim 1, wherein the means of the first peripheral for sending said second piece of information via the second communications channel comprise a second transceiver radiofrequency module and the means of the second peripheral for receiving said second piece of information via said second communications channel comprise a second transceiver radiofrequency module.

9. The system according to claim 1, wherein the two-way communications channel uses a same frequency as the second communications channel.

10. The system according to claim 1, wherein said first piece of information is a value representing the network address of said second peripheral and a piece of pseudo-random data generated within said second peripheral.

11. The system according to claim 10, wherein the second peripheral comprises means configured to generate said piece of pseudo-random data and to generate a new piece of pseudo-random data at each new detection of a human body.

12. The system according to claim 10, wherein said second piece of information contains said piece of pseudo-random data.

13. The system according to claim 1, wherein said second peripheral comprises means configured to verify that a piece of pseudo-random data received via said second piece of information is identical to a piece of pseudo-random data transmitted via said first piece of information and to authorize the opening of the two-way channel if this verification is positive and, if not, to reject this opening.

14. The system according to claim 1, wherein said two-way communications channel is a unicast wireless network between two peripherals.

15. The system according to claim 1, wherein said two-way communications channel is an encrypted channel.

16. The system according to claim 1, wherein the second peripheral comprises first means of control for detecting a moving away of the first peripheral from the second peripheral and for initiating a closing of a session on the computer.

17. The system according to claim 1, wherein the second peripheral comprises second means of control for detecting a loss of connection on the two-way communications channel and for initiating a closing of a session on the computer.

18. The system according to claim 1, wherein:
the first communications channel is made in the form of the capacitive coupling via the human body between said second peripheral and said first peripheral,
the second peripheral comprises means for detecting proximity of the human body and third means of control for initiating an interruption of connection with a first already paired peripheral in the event of a new detection of a human body by the means for detecting.

19. The system according to claim 1, wherein said second piece of information is a piece of data representing the network address of said first peripheral and of said first piece of information.

20. A method comprising:
dynamically pairing a first peripheral dialoguing with a memory card and a second peripheral connected to a computer, said first peripheral being a case configured for receiving said memory card and reading data contained in the memory card, and said second peripheral being a base connected to the computer, wherein the memory card contains pieces of information for opening a session on the computer, and wherein dynamically pairing comprises:
sending a first piece of information, via a first communications channel, by a first module of said second peripheral to a first module of said first peripheral by capacitive coupling via a human body;

receiving the first piece of information, via the first communications channel, by the first module of said first peripheral by capacitive coupling with the human body;

sending by said first peripheral to said second peripheral, in response to receipt of said first piece of information, a second piece of information via a second communications channel, the second piece of information having a value being a condition of authorization to open a two-way communications channel between said first and said second peripherals;

receiving said second piece of information by said second peripheral via said second communications channel;

opening the two-way communications channel between the first peripheral and the second peripheral in response to the second piece of information; and transmitting from the first peripheral to said second peripheral via the two-way communications channel the pieces of information for opening the session on said computer, read from the memory card by said first peripheral, the second peripheral receiving the pieces of information for opening the session to the computer.

21. The method according to claim 20, wherein said first communications channel is made in the form of the capacitive coupling via the human body between said second peripheral and said first peripheral.

22. The method according to claim 20, wherein the second communications channel is a radiofrequency channel.

23. The method according to claim 20, wherein the two-way communications channel uses a same frequency as the second communications channel.

24. The method according to claim 20, wherein the second peripheral generates a piece of pseudo-random data during the detection of a proximity of the human body and said first piece of information is a value representing the network address of said second peripheral and of the piece of pseudo-random data.

25. The method according to claim 24, the second peripheral generates a new piece of pseudo-random data at each new detection of a human body.

26. The method according to claim 24, wherein said second piece of information contains said piece of pseudo-random data.

27. The method according to claim 20, wherein said second peripheral verifies that a piece of pseudo-random data received via said second piece of information is identical to a piece of pseudo-random data transmitted via said first piece of information and authorizes the opening of the two-way channel if this verification is positive and rejects this opening if not.

28. The method according to claim 20, wherein the second peripheral transmits said pieces of information for opening the session to said computer.

29. The method according to claim 28, wherein the second peripheral detects a moving away of the first peripheral from the second peripheral and initiates a closing of a session on the computer.

30. The method according to claim 28, wherein the second peripheral detects a loss of connection on the two-way communications channel and initiates a closing of session on the computer.

31. The method according to claim 20, further comprising:

the first communications channel is made in the form of the capacitive coupling via the human body between said second peripheral and said first peripheral, the second peripheral initiates an interruption of connection with an already paired first peripheral if there is a new detection of proximity of a human body.

32. The method according to claim 20, wherein said second piece of information is a piece of data representing a network address of said first peripheral and said first piece of information.

* * * * *